No. 718,833. PATENTED JAN. 20, 1903.
W. H. GILBERT.
BEET PULLING AND LIFTING PLOW.
APPLICATION FILED AUG. 25, 1902.
NO MODEL.
Fig. 1.
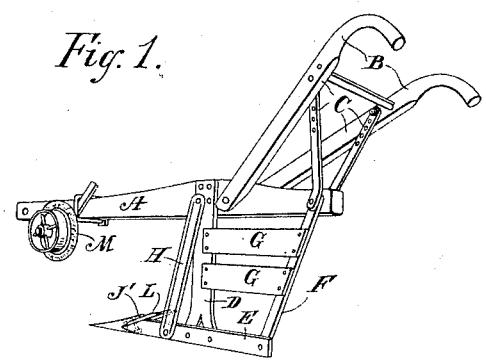
Fig. 2.
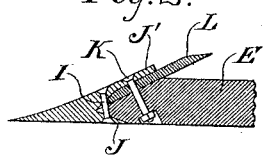
Fig. 3.    Fig. 4.
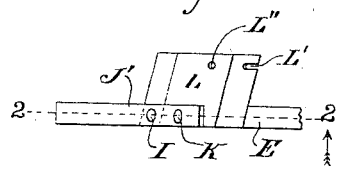    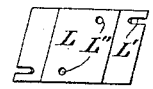
WITNESSES
Chas. L. Hyde
M. C. Nickelson
INVENTOR
William H Gilbert
BY Hazard & Carpham
ATTORNEYS
THE NORRIS PETERS CO., PHOTO-LITHO., WASHINGTON, D. C.

UNITED STATES PATENT OFFICE.

WILLIAM H. GILBERT, OF ORANGE COUNTY, CALIFORNIA.

BEET PULLING AND LIFTING PLOW.

SPECIFICATION forming part of Letters Patent No. 718,833, dated January 20, 1903.

Application filed August 25, 1902. Serial No. 121,005. (No model.)

*To all whom it may concern:*

Be it known that I, WILLIAM H. GILBERT, a citizen of the United States, residing in the county of Orange, State of California, have invented new and useful Improvements in Beet Pulling and Lifting Plows, of which the following is a specification.

My invention relates to a plow for use in harvesting sugar-beets. In harvesting sugar-beets it is desirable that the tap-root be pulled and lifted up without cutting, the ground around the beet loosened, so that it may be pulled out of the ground easily. It is also desirable that a tool for that purpose be devised in which the wearing parts may be detached easily, so they can be taken to the shop to be sharpened or repaired, and which when worn out may be quickly and cheaply replaced. I accomplish these objects by the plow described herein and illustrated in the accompanying drawings, in which—

Figure 1 is a perspective view of my plow. Figs. 2, 3, and 4 are detail views of parts thereof, Fig. 2 being a vertical section on the line 2 2 of Fig. 3.

In the drawings, A is the plow-beam, to which are pivotally connected the handles B, which are held at different elevations by the adjustable braces C to enable the plow to be used comfortably either by a tall or a short man.

D is the standard, to which the heel-bar E is attached. The rear end of the heel-bar is braced by the vertical brace-bar F. This brace-bar is connected with the standard by horizontal plates G, which prevent vines and grass from catching thereon and also help to make the plow more rigid. In front of the standard and detachably connected at the top by one of the bolts which unite the standard to the beam is the cutter-bar H, which is sharpened on both edges and may be turned edge for edge, thereby enabling its use in the field a long time before it must be taken to the shop to be sharpened. The lower end of this bar is bolted to the heel-bar. The front end of the heel-bar is bifurcated, and the furcations straddle bolt I, which passes through the bottom member J and top member J' of the slip-point and has the ends thereof riveted in said point. This point is V-shaped, and one arm of the V is preferably shorter than the other. This point is removably attached to the heel-bar by bolt K, which passes through the heel-bar and top member of the point and also through the pulling and lifting plate L, which lies partly between the top member of the point and the top of the front of the heel-bar, as shown in Figs. 2 and 3. The ends of bolt K are countersunk, as shown. The pulling and lifting plate has both edges sharpened alike, and each edge is provided with a notch L', which slips over the riveted bolt of the point, and a hole L'', through which the bolt passes which unites this plate and the point to the heel-bar. When the edge of the pulling and lifting plate which is nearer the point becomes dull, by removing this bolt the plate can be turned edge for edge, and when the second edge has become dull the plate can be removed from the plow and sent to the shop to be sharpened, and another plate can be used while this is being done. As these plates are not expensive, every plow should be provided with at least two of these plates. In like manner the plow-point may be removed and sent to the shop to be sharpened and another substituted while it is being done. This feature enables the constant use of the plow while the parts are being repaired, and the parts may be taken to the shop by a small boy who cannot use the plow. It will thus be seen that the wearing parts are light and are readily replaced, thus prolonging the life of the plow. On the front end of the beam is the combined colter and gage-wheel M, which cuts vines, grass, and other material which might clog the plow and at the same time regulates the depth at which the plow runs in the ground.

In the operation of my plow the gage-wheel is set so as to permit the plow to run at the required depth. Power necessary to draw it through the ground is attached to the front end of the beam in the usual manner. The operator then takes the handles and guides the plow, so that the standard passes just outside of the row of beets, and the pulling and lifting plate passes beneath the beets in the row, which lifts tap-root, raises the beets and soil surrounding the same the distance of the pitch of the lifting-plate, and then permits them to settle back, thereby loosening the beets in the soil and putting them in good condition to be drawn out of the soil. If desired, the bolt in the point could be made removable and two holes made in the front end of the heel-bar and lifting-plate; but such construction would consume more time in attaching and detaching the parts than the construction shown.

Having described my invention, what I claim as new, and desire to secure by Letters Patent, is—

1. A beet pulling and lifting plow comprising a beam having adjustable handles attached thereto; a standard affixed to said beam; a heel-bar affixed to said standard, a point and a lifting and pulling plate removably attached to the front end of said heel-bar.

2. A beet pulling and lifting plow comprising a beam having handles pivotally attached thereto, the rear ends of which are adjustable as to height; a standard affixed to said beam; a heel-bar affixed to said standard; a slip-point removably attached to the front end of said heel-bar; a pulling and lifting plate removably attached to said heel-bar and point.

3. A beet pulling and lifting plow comprising a beam having handles pivotally attached thereto, the rear ends of which are adjustable as to height; a standard affixed to said beam; a heel-bar having the front end pointed and bifurcated affixed to said standard; a V-shaped slip-point having a bolt extending through and from one arm of the V to the other arm thereof removably affixed to said heel-bar; a lifting and pulling plate having the opposite edges sharpened and having a notch in each edge near one end thereof and a hole near each notch removably affixed to said point and heel-bar.

4. In a beet pulling and lifting plow a V-shaped slip-point having a riveted bolt passing through and from one arm to the other arm of the V in combination with a pointed heel-bar having a bifurcated front end the furcations of which are adapted to straddle the bolt of the point and means to unite said point and bar comprising a bolt passing through a hole in each, the ends thereof being countersunk in the respective parts.

5. In a beet pulling and lifting plow a double-edged cutting and lifting plate having a notch in each edge near one end of the plate and a hole near each notch in combination with a slip-point and a heel-bar.

In witness that I claim the foregoing I have hereunto subscribed my name this 16th day of August, 1902.

W. H. GILBERT.

Witnesses:
H. T. HAZARD,
G. E. HARPHAM.